(12) United States Patent
Fidrich et al.

(10) Patent No.: US 7,773,786 B2
(45) Date of Patent: Aug. 10, 2010

(54) METHOD AND APPARATUS FOR THREE-DIMENSIONAL INTERACTIVE TOOLS FOR SEMI-AUTOMATIC SEGMENTATION AND EDITING OF IMAGE OBJECTS

(75) Inventors: Márta Fidrich, Szeged (HU); Imre Pap, Dóc (HU); Attila Tanács, Zákányszék (HU)

(73) Assignee: General Electric Company, Schenectady, NY (US)

(*) Notice: Subject to any disclaimer, the term of this patent is extended or adjusted under 35 U.S.C. 154(b) by 895 days.

(21) Appl. No.: 11/286,540

(22) Filed: Nov. 22, 2005

(65) Prior Publication Data

US 2007/0116334 A1 May 24, 2007

(51) Int. Cl.
*G06K 9/00* (2006.01)
(52) U.S. Cl. .................................................. 382/128
(58) Field of Classification Search ......... 382/128–132, 382/154, 173, 190; 600/443
See application file for complete search history.

(56) References Cited

U.S. PATENT DOCUMENTS

| | | | |
|---|---|---|---|
| 6,816,607 B2* | 11/2004 | O'Donnell et al. | 382/131 |
| 6,937,760 B2* | 8/2005 | Schoepflin et al. | 382/173 |
| 7,004,904 B2* | 2/2006 | Chalana et al. | 600/443 |
| 7,158,692 B2* | 1/2007 | Chalana et al. | 382/294 |
| 7,388,973 B2* | 6/2008 | Fidrich et al. | 382/128 |
| 2004/0024315 A1* | 2/2004 | Chalana et al. | 600/443 |
| 2005/0122343 A1* | 6/2005 | Bailey et al. | 345/619 |

FOREIGN PATENT DOCUMENTS

WO 2004/053792 6/2004

OTHER PUBLICATIONS

A. X. Falçao and J. K. Udupa. A 3D generalization of user-steered live-wire segmentation. Medical Image Analysis, 4:389-402, 2000.*
Yoo, S.-S., Lee, C.-U., Choi, B.G. And Saiviroonporn, P., 2001. Interactive 3-dimensional segmentation of MRI data in personal computer environment. J. Neurosci. Methods 112, pp. 75-82.*

(Continued)

*Primary Examiner*—Vu Le
*Assistant Examiner*—Andrae S Allison
(74) *Attorney, Agent, or Firm*—McAndrews, Held & Malloy, Ltd.; Peter J. Vogel; Michael A. Dellapenna

(57) ABSTRACT

A system and method for segmenting and editing anatomical objects from medical images is disclosed. The system may be a medical diagnostic imaging system. A computer unit may execute computer software for segmenting anatomical objects from medical images. The computer software may extract an anatomical object from planar curves. Additionally, the computer software may correct the shape of an existing three-dimensional anatomical object from planar curves. The planar curves may be orthogonal to each other. A user may contour of an anatomical object on a plurality of slices, such as an axial slice a sagittal slice, a coronal slice, or some combination thereof. The contour may be drawn using a tracing pen on a display unit. The display unit may receive touch screen input from the tracing pen. The display unit may display the three-dimensional segmented anatomical object.

30 Claims, 8 Drawing Sheets

OTHER PUBLICATIONS

M. Knapp, A. Kanitsar, and M.E. Gröller, "Semi-Automatic Topology Independent Contour-Based 2½ D Segmentation Using Live-Wire", Proceedings of WSCG 2004, 2004.*

Ehrhardt et al, Atlas-based determination of anatomical landmarks to support the virtual planning of hip operations, International Congress Series 1256 (2003) 99-104.*

Alexandre X. Falcao, Jayaram K. Udupa, Supun Samarasekera, Shoba Sharma, Bruce Elliot Hirsch, and Roberto de A. Lotufo. User-Steered Image Segmentation Paradigms: Live Wire and Live Lane. Graphical Models and Image Processing, No. 60, pp. 233-260, 1998.

Falcao A. X., Udupa J. K.: A 3D generalization of user-steered live-wire segmentation, Medical Image Analysis, 4(4):389-402, Dec. 2000.

Andrea Schenk, Guido Prause and Heinz-Otto Peitgen: Efficient Semiautomatic Segmentation of 3D Object in Medical Images, MeVis—Center for Medical Diagnostic Systems and Visualization, Universitaetsalle 29, 28359 Bremen, Germany, 2000, Assisted Intervention (MICCAI 2000), Pittsburgh (PA), USA, Oct. 11-14, 2000, in Delp S.L. et al. (eds.): Lecture Notes in Computer Science, vol. 1935, Springer, New York, 2000, pp. 186-195.

Derek R. Ney and Elliot K. Fishman: Editing Tools for 3D Medical Imaging (MPR Edit). IEEE Computer Graphics and Applications, vol. 11, Issue 6 (Nov. 1991), pp. 63-71.

http://www.medintec.de/mse/indexmse.html (visited Jan. 16, 2006).

http://www.cms-stl.com/products/ct_sim/index.htm (visited Jan. 16, 2006).

http://dosisoft.com.ikoula.com/eng/default_suite.asp (visited Jan. 16, 2006).

http://www.medical.philips.com/main/products/ros/products/smartsim/ (visited Jan. 16, 2006).

G. T. Herman, J. Zheng, C.A. Bucholtz: Shape-based interpolation, IEEE Computer Graphics and Applications, vol. 12, No. 3, pp. 69-79, May 1992.

T. McInerney et al.: Deformable models in medical image analysis: A survey, Medical Image Analysis, 1(2), pp. 91-108, 1996.

P. Besl and N. McKay. A method for Registration of 3D Shapes. IEEE Transactions on Pattern Analysis and Machine Intelligence, 14(2), pp. 239-256, Feb. 1992.

* cited by examiner

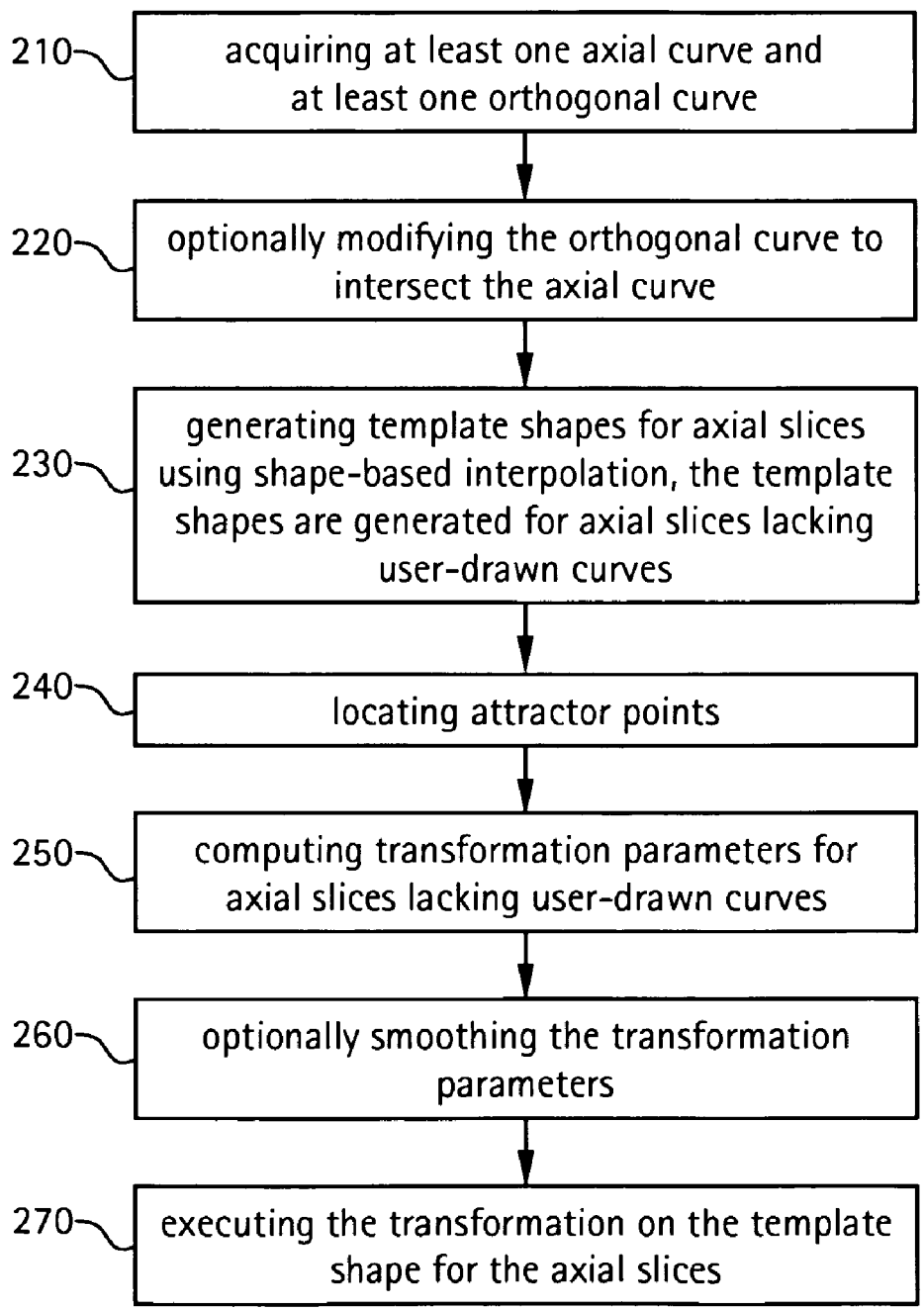

METHOD AND APPARATUS FOR THREE-DIMENSIONAL INTERACTIVE TOOLS FOR SEMI-AUTOMATIC SEGMENTATION AND EDITING OF IMAGE OBJECTS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to a system and method for improved medical imaging. Particularly, the present invention relates to a more efficient system and method for segmenting anatomical objects and correcting the segmentation of anatomical objects.

Medical diagnostic imaging systems encompass a variety of imaging modalities, such as x-ray systems, computerized tomography (CT) systems, ultrasound systems, electron beam tomography (EBT) systems, magnetic resonance (MR) systems, and the like. Medical diagnostic imaging systems generate images of an object, such as a patient, for example, through exposure to an energy source, such as x-rays passing through a patient, for example. The generated images may be used for many purposes. For instance, internal defects in an object may be detected. Additionally, changes in internal structure or alignment may be determined. Fluid flow within an object may also be represented. Furthermore, the image may show the presence or absence of objects in an object. The information gained from medical diagnostic imaging has applications in many fields, including medicine and manufacturing.

One application of utilizing the information gained from medical diagnostic imaging systems in the field of medicine is the segmentation of anatomical objects. The segmentation of anatomical objects and/or structures from two and three-dimensional images is important to allow the analysis of those anatomical objects and/or structures. For example, a particular organ or tissue may be extracted from the surrounding organs or tissues. The extracted organ or tissue may then be viewed independent of other objects that are not of interest. Such extraction allows a physician to focus only on the objects or structures of interest and develop a more accurate diagnosis and treatment strategy.

Anatomical segmentation, however, is a complex problem. Manual segmentation is a tedious, time consuming process. Fully automatic segmentation, although ideal, currently does not yield acceptable results. A combination of manual segmentation and automatic segmentation has yielded a number of interactive segmentation techniques.

Currently, a "live wire" technique allows a user to select a seed point on a contour, and while dragging and moving the mouse, the optimal line between the seed point and the current position may be computed. The live wire algorithm, however, may only be used in the two dimensional space and hence, this technique is a slice-by-slice segmentation, where the drawn contour on one slice becomes the initial contour on the next slice and this initial contour can be deformed.

Another strategy models edges in a surface mesh as semi-elastic linked elements in a chain. The surface mesh vertices connect the edges, so when a vertex is edited, the displacement stretches or compresses its neighboring edges. The difficulty in this strategy is to define the required extent of displacement. Another strategy that may be used is to use some medical information about the to-be-segmented object. The information may be a model, a map that can be verified to the actual medical images and then modified by the user. Since some medical objects may assume several forms, it is very hard to choose the correct model for the actual medial images or the degree of deformation allowable.

In addition, once an object has been segmented, a user still has the problem of manually editing the object. Usually, only minor changes are required after the display of the results of the algorithm. These changes, however, generally have to be made on several slices and on complex target shapes. Present editing tools are time consuming and difficult to use, making post-segmentation editing a disproportionately long and difficult task.

Accordingly, a system and method is needed for easier segmentation and editing of anatomical objects. Specifically, a need exists for a three-dimensional semi-automatic segmentation tool and a correction tool that is easier to use and more accurate than present tools. Such a system and method may allow a user to be more efficient and effective in diagnosing and treating medical conditions.

SUMMARY OF THE INVENTION

Certain embodiments of the present invention may include a method for segmenting anatomical objects from medical images. The method may include acquiring at least one axial curve and at least one orthogonal curve from a set of medical images. The orthogonal curve may include a sagittal curve or coronal curve. The method may also include optionally modifying the orthogonal curve to intersect the axial curve. The option is exercised if the axial curve and the orthogonal curve, as acquired, do not intersect.

Next, template shapes for axial slices may be generated using shape-based interpolation. The template shapes are generated for axial slices lacking user-drawn curves. Attractor points are then located by the intersections of the orthogonal curves and the axial planes. The transformation parameters for the axial slices lacking user-drawn curves are then computed. Various transformation methods may be used. In an embodiment, a two-dimensional affine transformation may be used. The points of the curves drawn on orthogonal slices may be used as attractors to guide the deformation. The transformation parameters may be computed by optionally complementing the input if the input does not account for sagittal or coronal input; computing the closest contour points to the attractor points for the slices and iteratively computing the parameters of the two-dimensional affine transformation. The transformation parameters are then optionally smoothed in the case of two-dimensional—slice-by-slice—transformation. Finally, the transformation is executed on the template shapes for the axial slices.

Moreover, certain embodiments of the present invention may include a method for correcting the shapes of existing three-dimensional anatomical objects from medical images. The method may include acquiring at least one axial curve and at least one orthogonal curve from a set of medical images. The orthogonal curve may include a sagittal curve or coronal curve. The method may also include optionally modifying the orthogonal curve to intersect the axial curve. The modification allows the orthogonal curves to intersect with the axial curves.

Next, template shapes for axial slices may be generated using shape-based interpolation. The generated template shapes may be modified on the axial slices to reach the to be corrected object. The template shapes are generated for axial slices lacking user-drawn curves. Attractor points are then located by the intersections of the orthogonal curves and the axial planes. The transformation parameters for the axial slices lacking user-drawn curves are then computed. Various transformation methods may be used. In an embodiment, a two-dimensional affine transformation may be used. The points of the curves drawn on orthogonal slices are used as attractors to guide the deformation. The transformation parameters may be computed by optionally complementing the input if the input does not account for sagittal or coronal input; computing the closest contour points to the attractor points for each slice; and iteratively computing the parameters of the two-dimensional affine transformation. The transformation parameters are then optionally smoothed in the case of two-dimensional—slice-by-slice—transformation. Next, the transformation is executed on the template shapes for the axial slices. Finally, a plurality of joints on the original object and the corrected object are smoothed.

Certain embodiments of the present invention include a medical diagnostic imaging system. The medical diagnostic imaging system may include a computer unit for manipulating data. The computer unit executes computer software for segmenting anatomical objects from medical images. The computer software may extract an anatomical object from planar curves. Alternatively, the computer software may correct the shape of an existing three-dimensional anatomical object from planar curves. The planar curves may be orthogonal to each other.

The medical diagnostic imaging system may also include an input unit for receiving input from a user. The input from a user being a contour of the anatomical object on a plurality of slices. The plurality of slices may comprise an axial slice, a sagittal slice, or a coronal slice, or some combination thereof. The medical diagnostic imaging system may also include a display unit for displaying a three-dimensional segmented anatomical object. The input unit may receive input from a tracing pen. The display unit may receive touch screen input.

The system and method described above may be carried out as part of a computer-readable storage medium including a set of instructions on a computer. The set of instructions may include an acquisition routine for acquiring at least one axial curve and one orthogonal curve from user input. An optional modification routine for modifying the orthogonal curve, the modification allowing the orthogonal curve to intersect with the axial curve. A generation routine for generating template shapes for axial slices. A location routine for locating attractor points. A computation routine for computing transformation parameters for axial slices lacking user-drawn curves. An optional smoothing routine for smoothing said transformation parameters. Finally, an execution routine for executing the transformation on the template shapes for the axial slices.

Additionally, the system and method described above may be carried out as part of a computer-readable storage medium including a set of instructions for a computer. The set of instructions may include an acquisition routine for acquiring at least one axial curve and one orthogonal curve from user input. The set of instructions may also include an optional modification routine for modifying the orthogonal curve, the modification allowing the orthogonal curve to intersect with the axial curve. The set of instructions may also include an generation routine for generating template shapes for axial slices. The set of instructions may also include an location routine for locating attractor points. The set of instructions may also include an computation routine for computing transformation parameters for axial slices lacking user-drawn curves. The set of instructions may also include an optional smoothing routine for smoothing said transformation parameters. The set of instructions may also include an execution routine for executing the transformation on the template shapes for said axial slices. Finally, the set of instructions may also include a second smoothing routine for smoothing the joints of said axial slices.

BRIEF DESCRIPTION OF THE DRAWINGS

FIG. 2 illustrates a method for segmenting anatomical objects from medical images that may be used in accordance with an embodiment of the present invention.

DETAILED DESCRIPTION OF THE INVENTION

Figure 1:
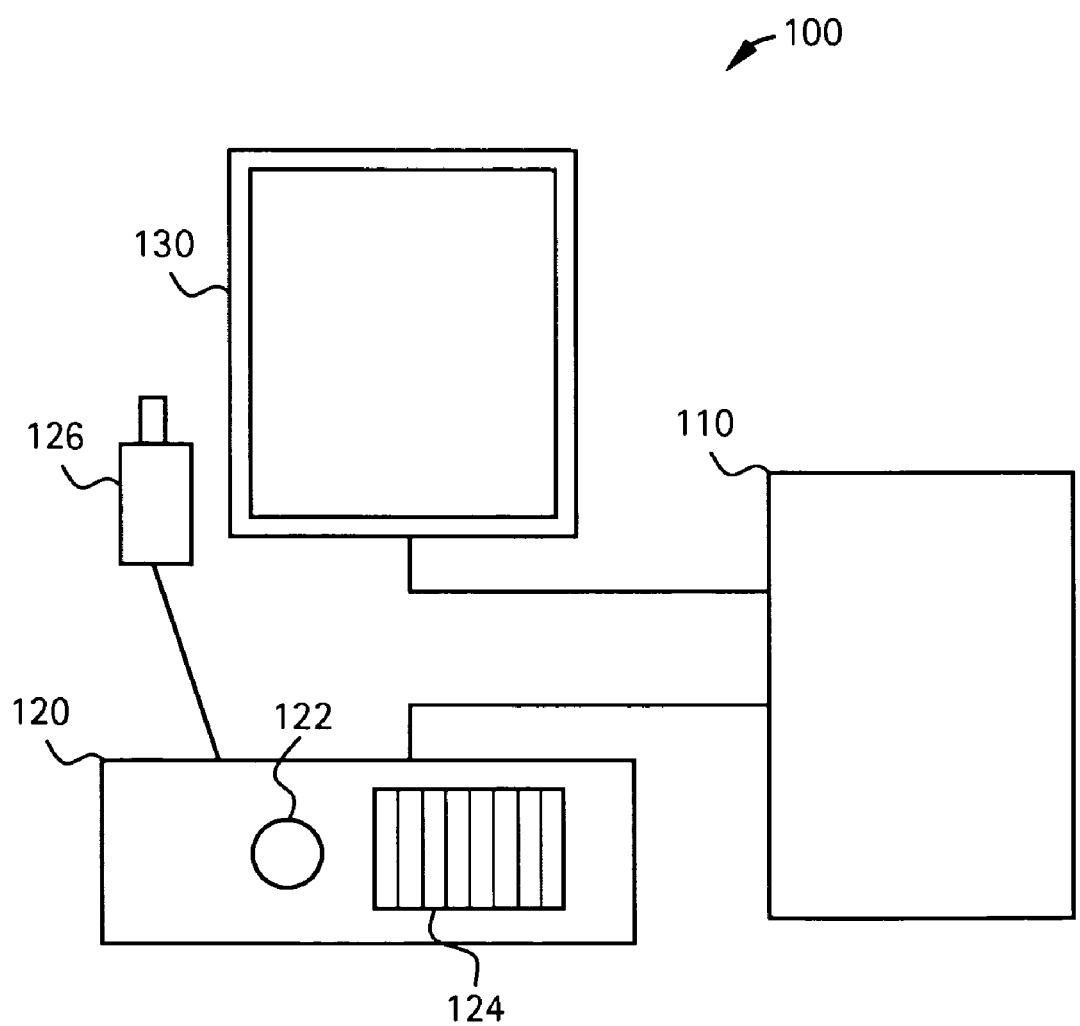
FIG. 1 illustrates a system for controlling the display and segmentation of medical images that may be used in accordance with an embodiment of the present invention.

FIG. 1 illustrates a system 100 for controlling the display and segmentation of medical images. The system 100 includes a computer unit 110. The computer unit 110 may be any equipment or software that permits electronic medical images, such as x-rays, ultrasound, CT, MRI, EBT, MR, or nuclear medicine for example, to be electronically acquired, stored, or transmitted for viewing and operation. The computer unit 110 may be connected to other devices as part of an electronic network.

The system 100 also includes an input unit 120. The input unit 120 may be a console having a track ball 122 and keyboard 124. The input unit 120 may also have a tracing pen 126. Other input devices may be used to receive input from a user as part of the input unit 120. For example a microphone may be used to receive verbal input from a user. The tracing pen 126 may communicate with the input unit 120 through a wire. The tracing pen 126 may also communicate with the input unit 120 in a wireless fashion.

The system 100 also includes at least one display unit 130. The display unit 130 may be a typical computer display unit. The display unit 130 may be in electrical communication with the computer unit 110 and input unit 120. The display unit 130 may have the capability of transmitting touch screen input from the tracing pen 126 to either the input unit 120 or the computer unit 110. For example, a user may use the tracing pen 126 to trace a curve on an image displayed on the display unit 130. The location of the curve may then be transmitted to the computer unit 110 for processing.

In an embodiment, the display unit 130 may represent multiple display units or display regions of a screen. Accordingly, any number of display units may be utilized in accordance with the present invention. Additionally, the computer unit 110, input unit 120, and display unit 130 may be separate units or be part of a single unit. Accordingly, the components of the system 100 may be single units, separate units, may be integrated in various forms, and may be implemented in hardware and/or in software.

In operation, the system 100 may be a medical diagnostic imaging system. The computer unit 110 may execute computer software for segmenting anatomical objects from medical images. The computer software may extract an anatomical object from planar curves. Alternatively, the computer software may correct the shape of an existing three-dimensional anatomical object from planar curves. The planar curves may be orthogonal to each other. The input unit 120 may receive input from a user. In an embodiment, the input may be a contour of the anatomical object to be segmented. The contour may be drawn on a plurality of slices, for example on an axial slice, a sagittal slice, a coronal slice, or some combination thereof. The contour may be drawn using a tracing pen 126 on the display unit 130. The display unit 130 may receive touch screen input from the tracing pen 126. The display unit may display the three-dimensional segmented anatomical object.

FIG. 2 illustrates a method 200 for segmenting anatomical objects from medical images. More specifically, the method 200 illustrates a three-dimensional interpolation method that may be used to speed up manual tracing of three-dimensional image structures or objects. The user may contour the anatomical structure on some of the axial, sagittal and/or coronal slices. A surface close to these curves may then be approximated. If the result is not acceptable, the user may contour on more slices at the critical area. The user may then rerun the extraction algorithm, which will provide more precise result. Thus the user is enabled to balance between precision and speed and can control the quality of result.

At step 210, the computer unit 110 acquires at least one axial curve and one orthogonal curve from user input. In order to provide the curves, a user is free to choose any kind of drawing tools such as a manual freehand tool, a live wire tool to more easily follow the visible borders, a polygon/spline drawing tool by clicking the vertex/control points or other tools available to a user. In general, the orthogonal slices, on which the orthogonal curves may be drawn, may be sagittal and/or coronal slices. Accordingly, a contiguous sequence of contours is created, and such sequence may define a surface.

Figure 3A:
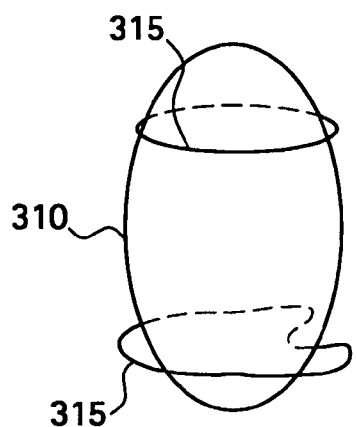
FIG. 3a-d illustrates an example of the method described in FIG. 2.

FIG. 3a illustrates an example of acquiring at least one axial curve and one orthogonal curve. In FIG. 3a, the "egg" curve is the input sagittal curve 310 drawn by a user on a sagittal slice. The generally horizontal curves are the input axial curves 315 drawn by a user on the axial slices.

Figure 4A:
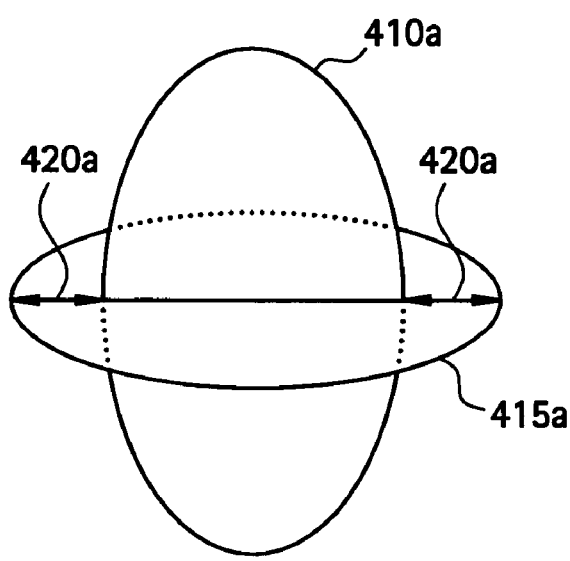
FIG. 4 illustrates an example of a step of the method described in FIG. 2.
Figure 4B:
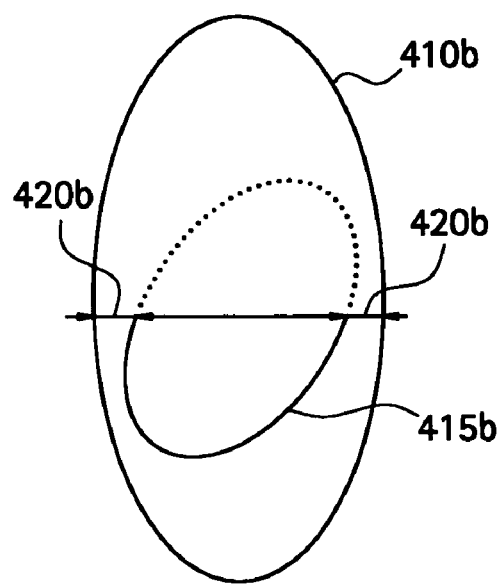

At step 220, if the orthogonal curve(s) and the axial curve(s) do not intersect, the orthogonal curve(s) may be modified so the orthogonal curve(s) intersects with the axial curve(s). When contours of a structure are precisely drawn, the curves on axial and orthogonal slices intersect. In FIG. 3a, the axial curves 315 and the sagittal curve 310 intersect. In practice, this is rarely true. FIG. 4 illustrates two examples of inconsistent input between an axial slice and an orthogonal slice. In FIG. 4a, the axial curve 415a exceeds the orthogonal curve 410a. The arrows 420a illustrate the difference. In FIG. 4b, the axial curve 415b is smaller than the orthogonal curve 410b. The arrows 420b illustrate the difference. In an embodiment, when input correction is requested, an algorithm modifies the orthogonal curves 410a and 410b. The orthogonal curves 410a and 410b are modified because it is assumed that the axial curves 415a and 415b are more precise.

Figure 3B:
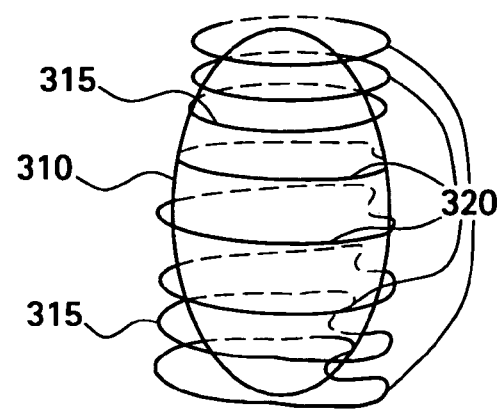

At step 230, template shapes are generated for axial slices. The template shapes are generated using shape-based interpolation. The template shapes are generated for axial slices lacking user-drawn curves. FIG. 3b illustrates step 230. The axial template shapes 320 illustrated in FIG. 3b are generated for axial slices lacking user drawn curves. In the example provided, axial curves having user drawn curves are axial curves 315. The axial curves 315 are shown in FIG. 3b along with the axial template shapes 320, as is the orthogonal curve 310. Accordingly, the axial template shapes 320 are an approximation of the axial curves 315.

Figure 3C:
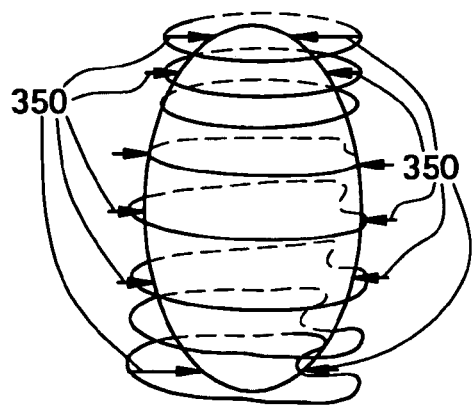

Next, at step 240, the attractor points are located. The attractor points are the intersections of the orthogonal curves and the axial planes. In the example of FIG. 3c, the attractor points are pointed by the arrowheads 350.

At step 250, the transformation parameters are computed for axial slices lacking user-drawn curves. Various transformation methods may be used. For example, affine or spline transformation either slice by slice or directly in three-dimensions, which may provide a global transformation. In another embodiment, an active contour/deformable surface approach may be used either slice by slice or directly in three-dimensions, which may provide locally varying deformation. The points of the curves drawn on orthogonal slices are may be used as attractors to guide the deformation. In order to compute the transformation parameters, first, the input is complemented. If the sagittal or coronal input is missing, information about the missing input is gathered. For example, if there is only a sagittal input, information about the coronal direction is collected. Second, the closest contour points to the attractor points are computed on a slice-by-slice basis. In an embodiment, the algorithm computing the transformation parameters requires attractor point—closest contour point pairs. Finally, the parameters of the two-dimensional affine transformation, which moves the closest contour points into the attractor points, are computed. In an embodiment, the parameters are computed with the Iterative Closest Point algorithm. In the Iterative Closest Point algorithm, the closest points between two data sets are identified as corresponding points. A cost function depending on the distance between the closest points between the two data sets is minimized with respect to rotation, translation and shearing parameters. After determining these parameters, the resulting transformation can be applied to the respective data set, so that both data sets move closer to each other. In FIG. 3c, the arrows 350 illustrate the direction of deformation.

At step 260, after the transformation parameters are computed, the transformation parameters are optionally smoothed in the case of two-dimensional—slice-by-slice—transformation. When the transformation parameters are computed slice-by-slice, results may be improved by smoothing the transformation parameters so that deformation of axial contours on subsequent slices vary smoothly. The smoothing weights may be 1, 2, 4, 2, 1, for example. For example, let the actual item be ai. The item ai gets weight 4, items ai−1 and ai+1 get 2 and item ai−2 and ai+2 get 1. Then we get the new ai value:

$$\text{new\_a}_i = \frac{a_{i-2} + 2a_{i-1} + 4a_i + 2a_{i+1} + a_{i+2}}{10} \qquad \text{Eq. 1}$$

Figure 3D:
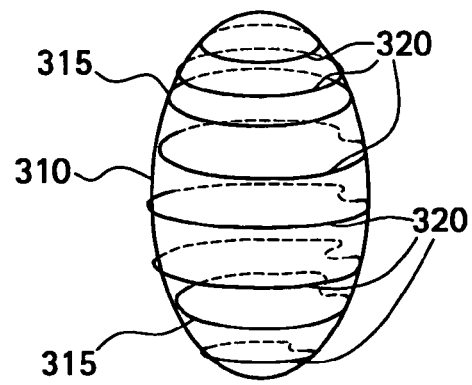

After the transformation parameters are computed and optionally smoothed, the transformation is executed at step 270 on the template shape for each axial slice. The axial templates 320 are deformed so that the axial templates 320 match the curve(s) 310 drawn on the orthogonal slice(s). In an embodiment, the deformation method is affine transformation. The results after the deformation of the axial curves are illustrated in FIG. 3d.

Figure 5B:
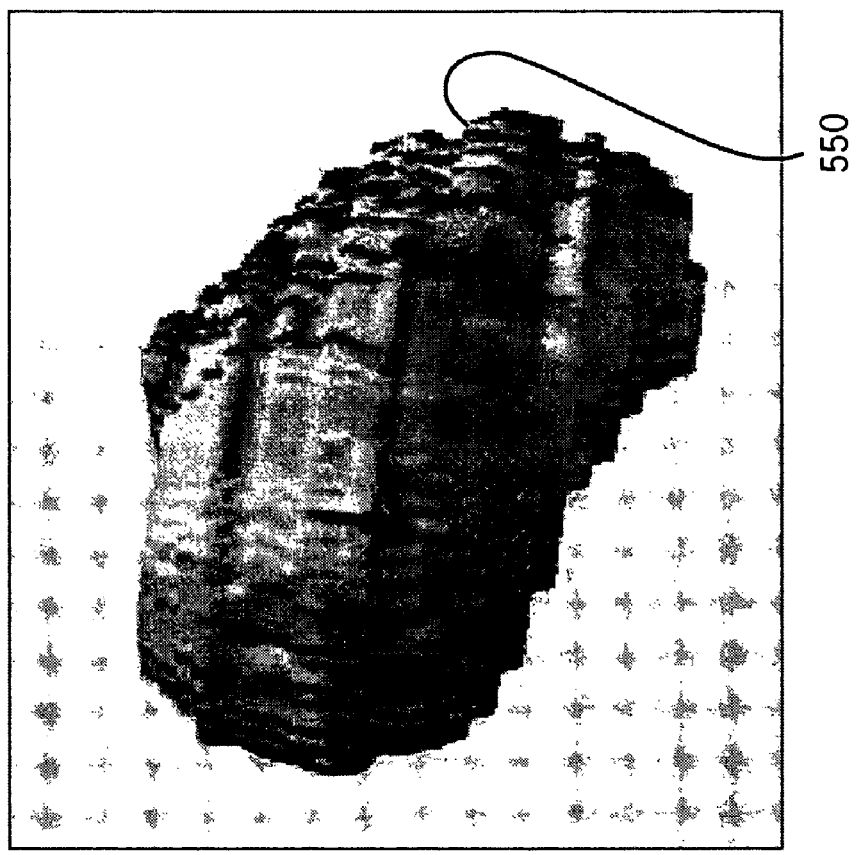
FIG. 5 illustrates, as an example of the method demonstrated in FIG. 2, the approximation of a bladder from two axial curves, one coronal curve, and one sagittal curve.
Figure 5A:
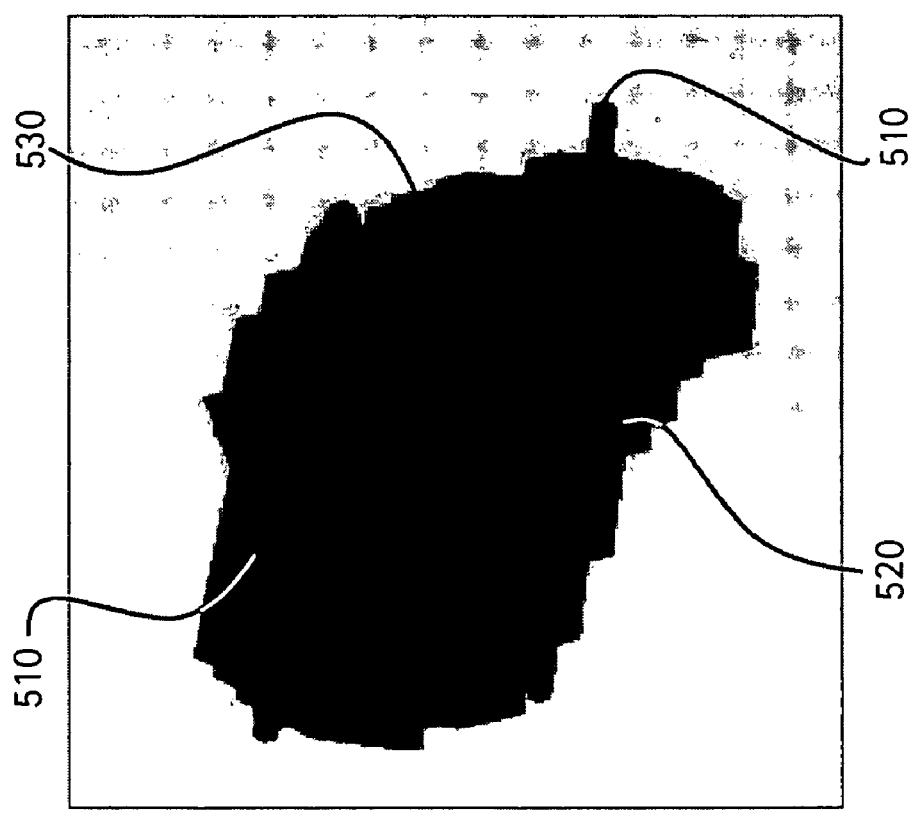

FIG. 5 illustrates, as an example of the three-dimensional interpolation method the approximation of a bladder from two axial curves, one coronal curve, and one sagittal curve. FIG. 5a illustrates user input curves. The two axial curves 510 are user input from axial slices. The coronal curve 520 is user input from a coronal slice. The sagittal curve 530 is user input from a sagittal slice. FIG. 5b illustrates the result of the segmentation of the bladder 550 after executing the three-dimensional interpolation method 200.

Figure 6:
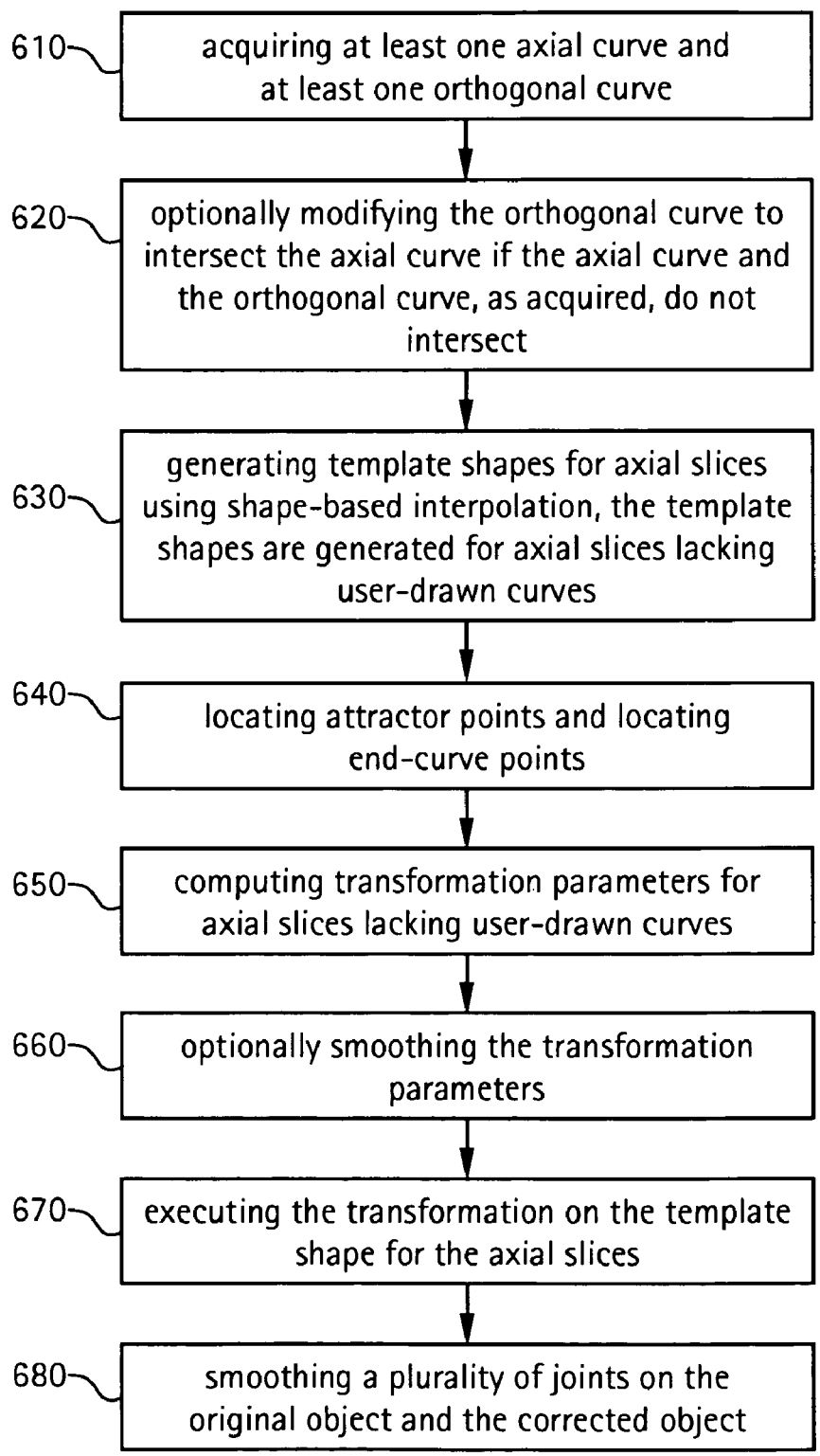
FIG. 6 illustrates a method for editing segmented anatomical objects from medical images that may be used in accordance with an embodiment of the present invention.

FIG. 6 illustrates a method 600 for editing segmented anatomical objects from medical images. More specifically, the method 600 illustrates a three-dimensional edit correction tool. In general, fully automatic segmentation methods usually do not give perfect results. There are cases, when the segmented surface does not go to the edges of the organ, or it may flow into other organs. Using this tool the user can correct the shape of an existing structure or object by providing some contours on some of the axial, sagittal and/or coronal slices. A surface close to the user drawn curves may then be approximated. If the result is not acceptable, the user may contour on some more slices at the critical area, and rerun the algorithm, which will provide more precise result. Thus the user is enabled to balance between precision and speed—can control the quality of result.

Figure 7A:
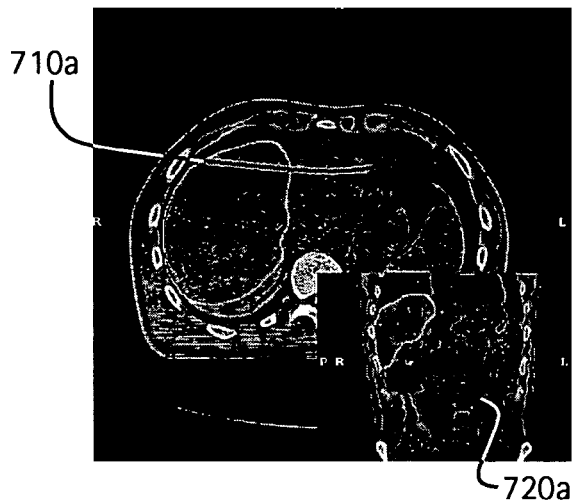
FIG. 7a-d illustrates, as an example of the method demonstrated in FIG. 6, a liver segmentation that has missed the left lobe and is corrected using the method described in FIG. 6.
Figure 7B:
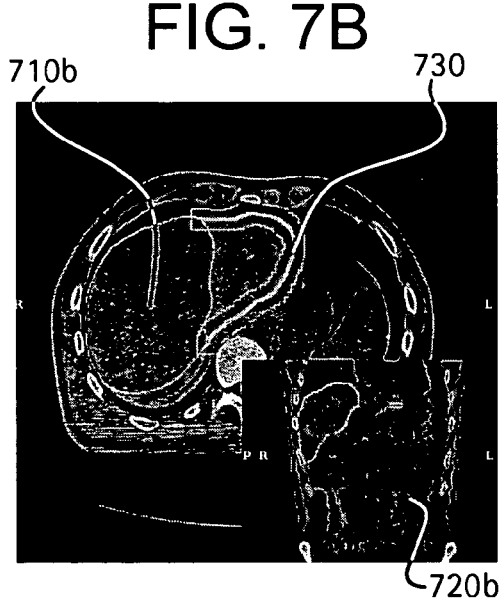
Figure 7C:
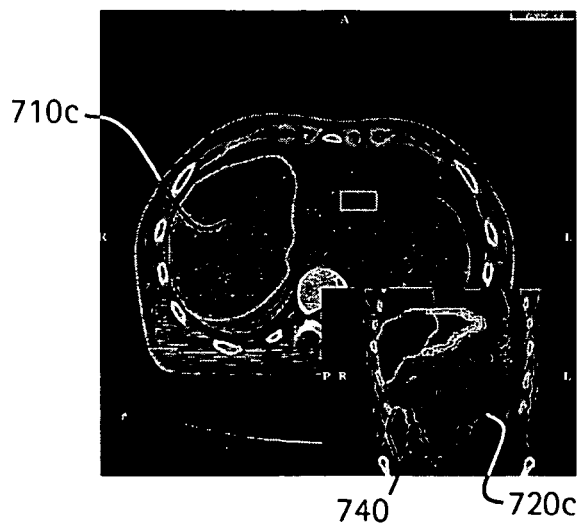

FIG. 7a illustrates an example of a liver segmentation that has missed the left lobe. Image 710a represents an axial image with the results of the liver segmentation outlined. Image 720a represents a coronal image with the results of the liver segmentation outlined. As is shown in both image 710a and 720a, the segmentation outline does not encompass the entire liver.

At step 610, the computer unit 110 acquires at least one axial curve and one orthogonal curve from user input. In order to provide the curves, a user is free to choose any kind of drawing tools such as a manual freehand tool, a live wire tool to more easily follow the visible borders, a polygon/spline drawing tool by clicking the vertex/control points or other tools available to a user. In general, the orthogonal slices, on which the orthogonal curves may be drawn, may be sagittal and/or coronal slices. Accordingly, a contiguous sequence of contours is created, and such sequence may define a surface.

In FIG. 7, Image 710b illustrates a user drawn curve 730 on the axial slice indicating the correct border of the organ. Image 720c illustrates a user drawn curve 740 on the coronal slice indicating the correct border of the organ. Accordingly, step 610 is satisfied with one axial input and one orthogonal input as shown in Figure 710 (b) and 720 (c).

Step, 620, is similar to step 220 above. At step 620, if the orthogonal curve(s) and the axial curve(s) do not intersect, the orthogonal curve(s) may be modified so the orthogonal curve(s) intersects with the axial curve(s).

Step 630 is similar to step 230 in the method 200, with the modification that the generated shapes may be modified on the axial slices to reach the to be corrected object, resulting in an extended template shape. Step 640 is similar to step 240 in that the attractor points are located; the attractor points are the intersections of the orthogonal curves and the axial planes. In step 640, however, two more attractor points are located as well, these are the closest points on the surface of the to be segmented object to the end-curve points of the axial curves.

Figure 8:
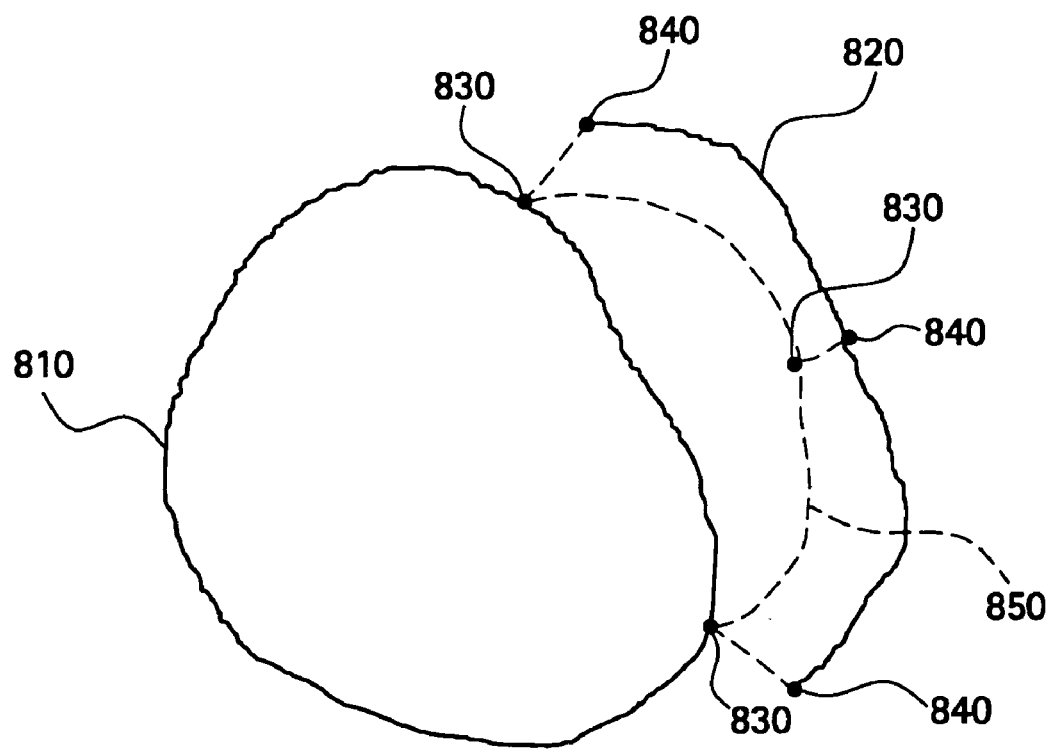
FIG. 8 illustrates an example of a step of the method described in FIG. 6.

FIG. 8 presents an example of step 640 and method 600. The closed line 810 is the segmented contour of the organ. The solid line 820 is the template curve that is generated from the user drawn axial input with shape-based interpolation. The dots 830 are the attractor points. The dots 840 are the contour points. The contour points 840 are the closest points on the template curve 820 to the attractor points 830. In the example shown here, two of the 830 dots are on the closed line 810 and are the closest points to the curve-end points 840. When the transformation is executed, the dashed line 850 becomes the new border of the organ.

Figure 7D:
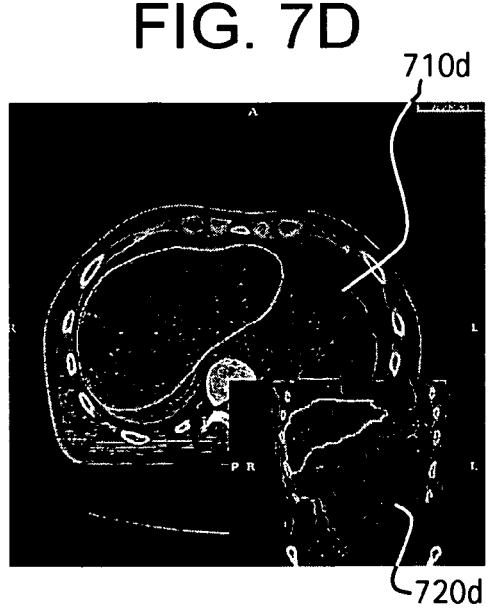

Steps 650, 660, and 670 are similar to the steps 250, 260, and 270 as described above. In the method 600 after the transformation algorithm executes, an additional step of 680 is used. In step 680, the joints of each slice are smoothed for the smooth transition between the original to be corrected object and the generated correcting object. Accordingly, after the execution of the method 600, a corrected organ is generated as shown in FIG. 7d. Figure 710d illustrates a corrected axial image. Figure 720d illustrates a corrected coronal image. In both 710d and 720d, the corrected images are outlined.

The system 100 and method 200 described above may be carried out as part of a computer-readable storage medium including a set of instructions for a computer. The set of instructions includes an acquisition routine to acquire at least one axial curve and one orthogonal curve from user input. The set of instructions also includes an optional modification routine to modify the orthogonal curve(s) so the axial and orthogonal curve(s) intersect. The set of instructions also includes a generation routine to generate template shapes for axial slices. The set of instructions also includes a location routine to locate the attractor points. The set of instructions also includes a computation routine to compute the transformation parameters for axial slices lacking user-drawn curves. The set of instructions also includes an optional smoothing routine for smoothing the transformation parameters. The set of instructions also includes an execution routine for executing the transformation on the template shape for each axial slice.

Additionally, the system 100 and method 600 described above may be carried out as part of a computer-readable storage medium including a set of instructions on a computer. The set of instructions includes an acquisition routine to acquire at least one axial curve and one orthogonal curve from user input. The set of instructions also includes an optional modification routine to modify the orthogonal curve(s) so the axial and orthogonal curve(s) intersect. The set of instructions also includes a generation routine to generate template shapes for axial slices. The set of instructions also includes a location routine to locate the attractor points. The set of instructions also includes a computation routine to compute the transformation parameters for axial slices lacking user-drawn curves. The set of instructions also includes an optional smoothing routine for smoothing the transformation parameters. The set of instructions also includes an execution routine for executing the transformation on the template shape for each axial slice. The set of instructions also includes a second smoothing routine for smoothing the joints of each slice for a smooth transition between the original to be corrected object and the generated correcting object.

While the invention has been described with reference to certain embodiments, it will be understood by those skilled in the art that various changes may be made and equivalents may be substituted without departing from the scope of the invention.

In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for segmenting anatomical objects from medical images, said method comprising a computer unit that performs the steps of:
   acquiring an axial curve and an orthogonal curve from a set of medical images;
   modifying the orthogonal curve to intersect the axial curve when the axial curve and the orthogonal curve, as acquired, do not intersect;
   generating template shapes for axial slices of the set of medical images using shape-based interpolation, the template shapes are generated for axial slices lacking user-drawn curves;
   locating attractor points by the intersections of the orthogonal curve and the axial curve;
   computing transformation parameters for axial slices lacking user-drawn curves, wherein the step of computing transformation parameters for axial slices lacking user-drawn curves is performed by carrying out the steps of: complementing an input when the input does not account for sagittal or coronal input; computing the closest contour points to the attractor points for each slice; iteratively computing the parameters of a two-dimensional affine transformation; and optionally smoothing the transformation parameters; and
   executing the transformation on said template shapes for the axial slices.

2. The method of claim 1, wherein said step of iteratively computing the parameters of the two-dimensional affine transformation is performed with an Iterative Closest Point algorithm.

3. The method of claim 1, wherein the orthogonal curve is a sagittal curve.

4. The method of claim 1, wherein the orthogonal curve is a coronal curve.

5. A method for correcting the shapes of existing three-dimensional anatomical objects from medical images, said method comprising using a computer unit to perform the steps of:
   acquiring an axial curve and an orthogonal curve from a set of medical images;
   modifying the orthogonal curve to intersect the axial curve when the axial curve and the orthogonal curve, as acquired, do not intersect;
   generating template shapes for axial slices of the set of medial images using shape-based interpolation, wherein the template shapes are modified on the axial slices to reach a corrected object, and the template shapes are generated for axial slices lacking user-drawn curves;
   locating end-curve and other attractor points, wherein the end-curve points are located by finding the closest points on the surface of an object to the end points of the axial curves, wherein the other attractor points are the intersections of the orthogonal curve and the axial curve;
   computing transformation parameters for axial slices lacking user-drawn curves, wherein the step of computing transformation parameters for axial slices lacking user-drawn curves is performed by carrying out the steps of: complementing an input when the input does not account for sagittal or coronal input; computing the closest contour points to the attractor points for each slice; iteratively computing the parameters of a two-dimensional affine transformation; and optionally smoothing the transformation parameters;
   executing the transformation on the template shape for the axial slices; and
   smoothing a plurality of joints on the object and the corrected object.

6. The method of claim 5, wherein said step of iteratively computing the parameters of the two-dimensional affine transformation is performed with an Iterative Closest Point algorithm.

7. The method of claim 5, wherein the orthogonal curve is a sagittal curve.

8. The method of claim 5, wherein the orthogonal curve is a coronal curve.

9. A medical diagnostic imaging system, said system comprising:
   a computer unit for manipulating data, said computer unit executing computer software for segmenting anatomical objects from medical images, said computer software extracting an anatomical object from planar curves, said planar curves being orthogonal to each other, said computer software modifying said orthogonal planar curves to intersect one another when said orthogonal planar curves, as acquired, do not intersect, wherein said computer unit computes transformation parameters for axial slices lacking user-drawn curves by complementing an input when the input does not account for sagittal or coronal input, computing the closest contour points to attractor points for each slice, iteratively computing the parameters of a two-dimensional affine transformation, and optionally smoothing the transformation parameters;
   an input unit for receiving input from a user, said input being a contour of said anatomical object on a plurality of slices; and,
   a display unit for displaying a three-dimensional segmented anatomical object.

10. The system of claim 9, wherein said plurality of slices comprise an axial slice.

11. The system of claim 9, wherein said plurality of slices comprise a sagittal slice.

12. The system of claim 9, wherein said plurality of slices comprise a coronal slice.

13. The system of claim 9, wherein said input unit includes a tracing pen.

14. The system of claim 9, wherein said display unit may receive touch screen input.

15. A medical diagnostic imaging system, said system comprising:
   a computer unit for manipulating data, said computer unit executing computer software for segmenting anatomical objects from medical images, said computer software correcting the shape of an existing three-dimensional anatomical object from planar curves, said planar curves being orthogonal to each other, said computer software modifying said orthogonal planar curves to intersect one another when said orthogonal planar curves, as acquired, do not intersect, wherein said computer unit computes transformation parameters for axial slices lacking user-drawn curves by complementing an input when the input does not account for sagittal or coronal input, computing the closest contour points to attractor points for each slice, iteratively computing the parameters of a two-dimensional affine transformation, and optionally smoothing the transformation parameters;

an input unit for receiving input from a user, said input being a contour of said anatomical object on a plurality of slices; and a display unit for displaying a three-dimensional segmented anatomical object.

16. The system of claim 15, wherein said plurality of slices comprise an axial slice.

17. The system of claim 15, wherein said plurality of slices comprise a sagittal slice.

18. The system of claim 15, wherein said plurality of slices comprise a coronal slice.

19. The system of claim 15, wherein said input unit includes a tracing pen.

20. The system of claim 15, wherein said display unit may receive touch screen input.

21. A non-transitory computer-readable storage medium including a set of instructions for a computer, the set of instructions comprising:

an acquisition routine for acquiring an axial curve and an orthogonal curve from user input;

a modification routine for modifying the orthogonal curve, said modification routine intersecting the axial curve with the orthogonal curve when the axial curve and the orthogonal curve, as acquired, do not intersect;

a generation routine for generating template shapes for axial slices;

a location routine for locating attractor points;

a computation routine for computing transformation parameters for axial slices lacking user-drawn curves, wherein said computation routine is configured to: complement an input when the input does not account for sagittal or coronal input; compute the closest contour points to the attractor points for each slice; iteratively compute the parameters of a two-dimensional affine transformation; and optionally smooth the transformation parameters; and an execution routine for executing the transformation on the template shapes for the axial slices.

22. A non-transitory computer-readable storage medium including a set of instructions for a computer, the set of instructions comprising:

an acquisition routine for acquiring an axial curve and an orthogonal curve from user input;

a modification routine for modifying the orthogonal curve, said modification routine intersecting the axial curve with the orthogonal curve when the axial curve and the orthogonal curve, as acquired, do not intersect;

a generation routine for generating template shapes for axial slices;

a location routine for locating end curve and attractor points;

a computation routine for computing transformation parameters for axial slices lacking user-drawn curves, wherein said computation routine is configured to: complement an input when the input does not account for sagittal or coronal input; compute the closest contour points to the attractor points for each slice; iteratively compute the parameters of a two-dimensional affine transformation; and optionally smooth the transformation parameters;

an execution routine for executing the transformation on the template shapes for the axial slices; and a smoothing routine for smoothing the joints of the axial slices.

23. The method of claim 1, wherein said executing the transformation on said template shapes for the axial slices is guided by the attractor points.

24. The method of claim 5, wherein said executing the transformation on the template shape for the axial slices is guided by the attractor points.

25. The computer-readable storage medium of claim 21, wherein said execution routine utilizes data regarding the attractor points to execute the transformation on the template shapes for the axial slices.

26. The computer-readable storage medium of claim 22, wherein said execution routine utilizes data regarding the attractor points to execute the transformation on the template shapes for the axial slices.

27. The system of claim 9, wherein said computer unit iteratively computes the parameters of the two-dimensional affine transformation with an Iterative Closest Point algorithm.

28. The system of claim 15, wherein said computation unit iteratively computes the parameters of the two-dimensional affine transformation with an Iterative Closest Point algorithm.

29. The computer-readable storage medium of claim 21, wherein the computation routine is configured to iteratively compute the parameters of the two-dimensional affine transformation with an Iterative Closest Point algorithm.

30. The computer-readable storage medium of claim 22, wherein the computation routine is configured to iteratively compute the parameters of the two-dimensional affine transformation with an Iterative Closest Point algorithm.

* * * * *